Oct. 31, 1950 J. G. STEPHENSON ET AL 2,527,773

ULTRA HIGH FREQUENCY MODULATION CIRCUIT

Filed March 29, 1946

INVENTORS
JOHN G. STEPHENSON
ROGER R. WEBSTER

BY
William D. Hall
ATTORNEY

Patented Oct. 31, 1950

2,527,773

UNITED STATES PATENT OFFICE 2,527,773

ULTRA HIGH FREQUENCY MODULATION CIRCUIT

John G. Stephenson, Mineola, N. Y., and Roger R. Webster, Long Beach, Calif., assignors to the United States of America as represented by the Secretary of War Application March 29, 1946, Serial No. 657,946

3 Claims. (Cl. 332—43)

This invention relates to electrical apparatus and more particularly to improvements in radio frequency generators.

A common type of oscillator for ultra-high frequencies is the coaxial line oscillator utilizing lighthouse tubes. Frequently it is desirable to modulate the output of the coaxial line oscillator, often with frequencies extending into the video frequency range. The customary method of modulation is to modulate either the anode-to-cathode voltage (plate modulation) or the grid-to-cathode voltage (grid or cathode modulation). Because of the very high Q of the coaxial line tank circuit, even when loaded by its output circuit, it is exceedingly difficult to obtain wide band modulation of the coaxial line oscillator with the customary types of modulation.

Accordingly an object of the present invention is to provide a method for wide band modulation of coaxial line oscillators.

Other objects and advantages of the invention will be apparent during the course of the following description.

Figure 1:
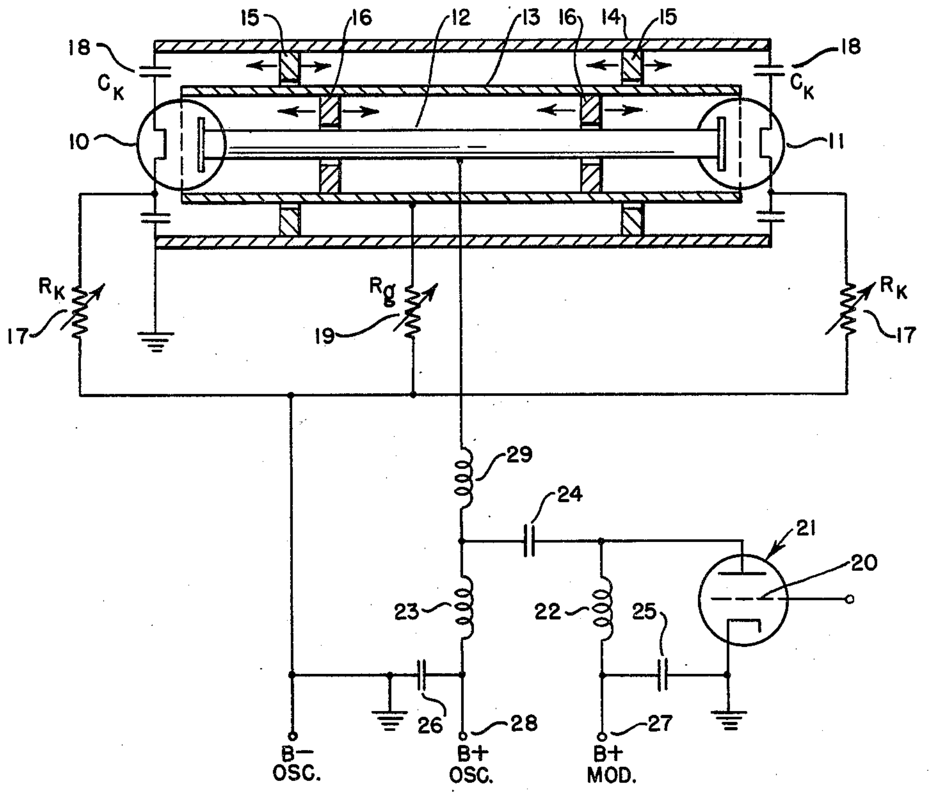
Figure 2:
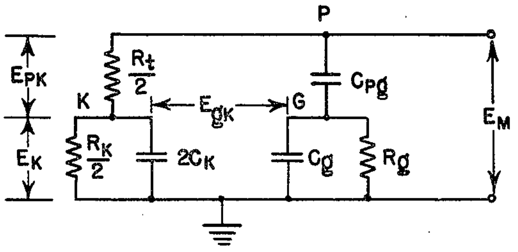

In the accompanying drawing forming a part of this specification:

Fig. 1 is a semi-diagrammatic view of a modulated push-pull coaxial line oscillator which illustrates one embodiment of the present invention; and Fig. 2 illustrates the video frequency equivalent circuit for Fig. 1.

Essentially the present invention attains wide band modulation of a coaxial line oscillator by utilizing simultaneous plate and grid modulation. The phase relation between the grid-to-cathode modulating voltage and the anode-to-cathode modulating voltage is not critical, but should be less than about 90°, since beyond this point the output amplitude decreases sharply. Certain oscillators are readily adapted to simultaneous grid and plate modulation. Thus the push-pull coaxial line oscillator of Fig. 1, in which the grids are ordinarily grounded, may be adapted for simultaneous grid and plate modulation merely by inserting a high video frequency (modulation frequency) impedance but low ultra-high frequency (oscillator frequency) impedance between the grids and ground. This may readily be done by substituting for the customary short circuiting tuning plungers in the grid-cathode and anode-grid coaxial lines, non-shorting tuning plugs which do not short circuit the coaxial line. These non-shorting tuning plugs constitute a low impedance discontinuity for the ultra-high frequency enabling the coaxial line to be tuned, but are a high impedance to the video modulation frequencies.

While the invention will be described in its application to a push-pull, coaxial line, ultra-high frequency oscillator, it should be obvious that this form of modulation may be applied to radio frequency generators in general and will apply to R-F oscillators and transmitters as well as to the modulated amplifier stage of R-F transmitters. Such simultaneous grid and plate modulation may be used to increase the bandwidth of modulation wherever a relatively high Q limits the bandwidth. There is an accompanying nonlinearity of the modulation envelope when simultaneous grid and plate modulation are used. For many applications this nonlinearity is not objectionable.

It is to be noted that simultaneous grid and plate method includes the special case of cathode modulation (i. e. simultaneous grid and plate modulation with zero degrees phase difference).

In Fig. 1 wherein is shown one embodiment of the present invention, numerals 10 and 11 designate two lighthouse type triode vacuum tubes used in a push-pull coaxial line oscillator circuit. Three concentric lines or cylinders 12, 13 and 14, associated with the anodes, grids and cathodes respectively of tubes 10 and 11, form the anode-grid and grid-cathode coaxial lines. The anode-grid coaxial line is formed by cylinder 12 and the inner surface of cylinder 13, while the grid-cathode coaxial line is formed by the outer surface of cylinder 13 and the inner surface of cylinder 14. These coaxial lines, in conjunction with the interelectrode and stray capacitances of the tubes 10 and 11 constitute the grid and anode tank circuits.

The grid-cathode line for each tube is tuned by a non-shorting tuning plug 15 which constitutes a low impedance for the ultra-high frequency of the coaxial line oscillator but a high impedance to the video modulation frequencies. In a similar manner the anode-grid coaxial line for each tube is tuned by a non-shorting tuning plug 16.

Cathode bias for tubes 10 and 11 is provided by cathode resistors 17 and cathode by-pass condensers 18. Grid bias for tubes 10 and 11 is provided by the capacitance between the grid cylinder 13 and ground, and by grid leak 19.

The modulation circuit used is a modified Heising type. Modulation voltages are applied between grid 20 and the cathode of a modulator tube 21. The modulating voltages are amplified and appear across modulation choke 22. The same modulation voltages are impressed across current-stabilizing choke 23 by means of a choke-condenser type of coupling which includes capacitors 24, 25 and 26.

Numeral 27 designates the anode voltage supply for modulator tube 21, while numeral 28 designates the anode voltage supply for tubes 10 and 11. An ultra-high frequency choke 29 is inserted between the anode line 12 and the anode voltage supply 28 to keep the oscillator frequencies out of the power supply.

Fig. 2 illustrates the video frequency equivalent circuit of Fig. 1 and may be utilized for determining the relative amplitude and phase of the grid-to-cathode modulation voltage $E_{gk}$ with respect to the impressed modulating voltage $E_m$, as a function of the circuit parameters. The letters P, G and K represent the anodes, control grids and cathodes of tubes 10 and 11. The parallel combination of $$\frac{R_k}{2}$$

and $2C_k$ represents the parallel impedance of the two cathode resistors 17 and the two cathode bypass condensers 18.

$$\frac{R_t}{2}$$

represents the parallel dynamic impedance which tubes 10 and 11 present to the modulator. $C_{pg}$ is the total anode-to-grid capacitance, $C_g$ the capacitance between grid and ground and $R_g$ the grid resistance 19. $E_k$, the cathode voltage for tubes 10 and 11, is small compared to the anode-to-cathode modulating voltage $E_{pk}$, and hence $E_{pk}$ is approximately equal to $E_m$, the impressed modulating voltage. $E_{gk}$ is the grid-to-cathode modulating voltage for tubes 10 and 11. The circuit of Fig. 2 allows the determination of the magnitude and phase of $E_{gk}$ in terms of $E_m$ as a function of the circuit parameters. The phase relation between $E_{gk}$ and $E_m$ is not critical so long as it is less than 90°.

The circuit of Fig. 2 shows that for the push-pull coaxial line oscillator of Fig. 1, simultaneous grid and plate modulation is very readily obtained by the use of the non-shorting tuning plugs 15 and 16. The modulation bandwidth of this circuit may be made substantially twice that of the customary coaxial line oscillator.

For the wide band modulation of other types of radio frequency generators, simultaneous plate and grid modulation may be effected by simultaneously varying the anode-to-cathode and grid-to-cathode voltages with a phase difference of less than approximately 90°.

It will be apparent that there may be deviations from the invention as described which still fall fairly within the spirit and scope of the invention.

Accordingly all such deviations are claimed which fall fairly within the spirit and scope of the invention as identified in the hereinafter appended claims.

What is claimed is:

1. A modulated push-pull coaxial line vacuum tube oscillator including anode-grid and grid-cathode coaxial lines, and tuning plungers for tuning said anode-grid and grid-cathode coaxial lines, said tuning plungers being adapted to have a relatively low impedance at the oscillator frequency and a relatively high impedance at the modulating frequencies.

2. The oscillator of claim 1, wherein said tuning plungers include non-shorting plugs disposed within said coaxial lines.

3. A circuit for modulating substantially simultaneously the anode and grid circuits of a modulated ultra high frequency vacuum tube stage, including anode-grid and grid-cathode coaxial lines coupled to the respective elements of said tube, and non-shorting plugs disposed within said coaxial lines for tuning thereof, said plugs offering a relatively high impedance at the modulating frequencies and a relatively low impedance at ultra high frequencies.

JOHN G. STEPHENSON.
ROGER R. WEBSTER.

REFERENCES CITED

The following references are of record in the file of this patent:

UNITED STATES PATENTS

| Number | Name | Date |
|---|---|---|
| 1,979,668 | Boddie | Nov. 6, 1934 |
| 2,066,970 | Tyler | Jan. 5, 1937 |
| 2,298,099 | Van Roberts | Oct. 6, 1942 |
| 2,416,080 | Bailey | Feb. 18, 1947 |